Fig. 1

INVENTORS
James A. Hunt
Harold C. Reinhardt
BY Warren, Brosler, Cypher & Anglim Attorneys

INVENTORS
James A. Hunt
BY Harold C. Reinhardt
Warren, Brosler, Cypher &
Anglim Attorneys

Fig. 4

INVENTORS
James A. Hunt
Harold C. Reinhardt
BY Warren, Brosler, Cypher & Anglim Attorneys

Fig. 5

April 2, 1968  J. A. HUNT ETAL  3,375,755
CONTROL DEVICE FOR AUTOMATING SEQUENTIAL MACHINE OPERATION
Filed Oct. 19, 1965  7 Sheets-Sheet 5

Fig. 6

INVENTORS
James A. Hunt
Harold C. Reinhardt
BY
Warren, Brosler, Cypher &
Anglim Attorneys April 2, 1968  J. A. HUNT ETAL  3,375,755
CONTROL DEVICE FOR AUTOMATING SEQUENTIAL MACHINE OPERATION
Filed Oct. 19, 1965  7 Sheets-Sheet 6

INVENTORS
James A. Hunt
BY Harold C. Reinhardt
Warren, Brosler, Cypher &
Anglim Attorneys

Fig. 8

INVENTORS
James A. Hunt
Harold C. Reinhardt
BY Warren, Brosler, Cypher &
Anglim Attorneys United States Patent Office 3,375,755
Patented Apr. 2, 1968

3,375,755
CONTROL DEVICE FOR AUTOMATING
SEQUENTIAL MACHINE OPERATION
James A. Hunt, 335 Almshouse Road, Woodcliff Lake, N.J. 07680, and Harold C. Reinhardt, Roger Court, Doylestown, Pa. 17219
Filed Oct. 19, 1965, Ser. No. 497,682
12 Claims. (Cl. 91—1)

ABSTRACT OF THE DISCLOSURE

The control device is adapted for automating a machine or apparatus having a cyclic operation and includes the combination of sensors for sensing terminal positions in such operation, a pair of cam shafts and a two-way controller operated thereby, second sensors sensing the position of the cam shafts, and a power circuit for advancing the cam shafts in steps as the machine is actuated through cycles of its operation, in an arrangement wherein the control device will not advance to energize the next sequential operation of the machine until the first operation of the machine has been completed.

---

The invention relates to apparatus for controlling the several sequential operations of a machine tool, or other machine or apparatus used in the production of goods or in the control of chemical processes and the like. The present device is intended to control automatically the proper sequential operations of the several parts of a piece of automatic machinery in which the several parts are required to perform their individual operations to complete an operating cycle and then start over in a repetitive cycle.

An object of the present invention is to provide a control device of the character described in which the power for the operation of the several parts of the machine being automated is directly monitored by the control device thus providing a control system of a very high reliability and one in which conventional control parts such as solenoid valves and relays, and their attendant likelihood of eventual malfunctioning, are eliminated.

Another object of the present invention is to provide a control device of the character above which will stop the operation of the machine being automated upon failure of performance of any one of its several parts, thus positively preventing the continued running of the malfunctioning machine and its possible damage, and a wasteful production of defective parts by the machine. An important feature of the control system provided by the present device is that the several parts of the machine being automated are required to complete their individual function in prescribed sequence as a condition to the continued operation of the machine.

A further object of the present invention is to provide a control device of the above character which will afford a visual indication of each step then being performed by the machine automated by the control, and to direct the operator to the malfunctioning part of the machine when the machine has been shut down due to malfunctioning as above described.

The invention possesses other objects and features of advantage, some of which of the foregoing will be set forth in the following description of the preferred form of the invention which is illustrated in the drawings accompanying and forming part of this specification. It is to be understood, however, that variations in the showing made by the said drawings and description may be adopted within the scope of the invention as set forth in the claims.

The control device of the present invention is designed for use with any of a large number and types of machines having a plurality of parts operating in predetermined sequence to complete an operating cycle of the machine. In such case, the present control device monitors the power to actuators for such parts and receives back information to continue operation from sensors, such as limit switches, and the like, provided on the machine for sensing the completion of operation of each part as they are sequentially operated; an essential feature being that each part must complete its individual operation before the control device will furnish power to the actuator for the next sequentially operating part. The machine or apparatus to be automated by the present control device may thus be thought of as having at least one reciprocally moving part and reciprocally moving actuator therefor and sensors for sensing the terminal positions of the part. In practice such machines are likely to have a number of such reciprocally moving parts and actuators. By way of specific illustration of at least one machine automated by the present control device, a more detailed description of a plastic injection molding machine is hereinafter contained.

Figure 7:
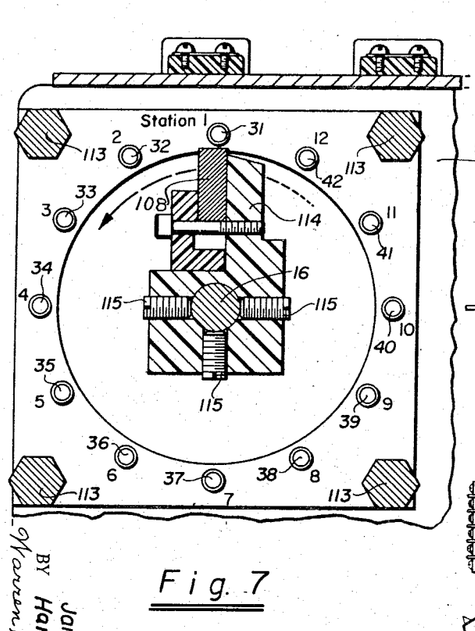
FIGURE 7 is a fragmentary cross-sectional view of the device taken substantially on the plane of line 7—7 in FIGURE 1.

The control device of the present invention comprises, briefly, a pair of spaced apart parallel cam shafts 16 and 17 connected for joint rotation to circumferentially spaced operating stations; at least one two-way controllers 18, 19 and 20 adapted for connection to an energy source (not shown) and to the actuator of the machine part being automated and having reciprocally displaced positions effecting a correlated displacement of the machine actuator and part; cams 22, 23, 24, 25, 26 and 27 mounted on shafts 16 and 17 and engageable with controllers 18, 19 and 20 for reciprocal displacement thereof upon rotation of shafts 16 and 17 to the several operating stations; switches 31, 32, 33, 34, 35, 36, 37, 38, 39, 40, 41 and 42, see FIGURE 7, mounted for sensing the positioning of the shafts in its several operating stations; and power driven means here including an electric motor 46, clutch 47 and brake 48, connected to the cam shafts 16 and 17 and adapted for connection to a power source and the limit switches on the machine being automated and switches 31–42 for advancing the cam shafts in steps from station to station as the part or parts of the machine being automated is or are successively displaced to terminal positions.

It is quite feasible to adapt the present control device to air pressure, vacuum or hydraulic systems instead of the electrical system as here disclosed the interchangeability of such power sources being readily understood in the art. For example the aforementioned sensors for sensing the terminal positions of the part of the machine being automated may be an electric switch or a pneumatic or hydraulic valve. Similarly the electric motor 46, electric clutch 47 and the electric brake 48 may be replaced by equivalently operating pneumatic or hydraulic units; and the two-way controllers 18, 19 and 20 may be slide valves as here shown for operating pneumatic or hydraulic actuators on the machine being automated, or these controllers may be heavy duty electric switches for controlling the power flow to electric motors or solenoids in the machine being automated. In the case of the controllers 18, 19 and 20 it is a feature of the present invention that they directly monitor and control the power source to the actuators in the machine being automated and do not require the addition of relays or the like.

Figure 1:
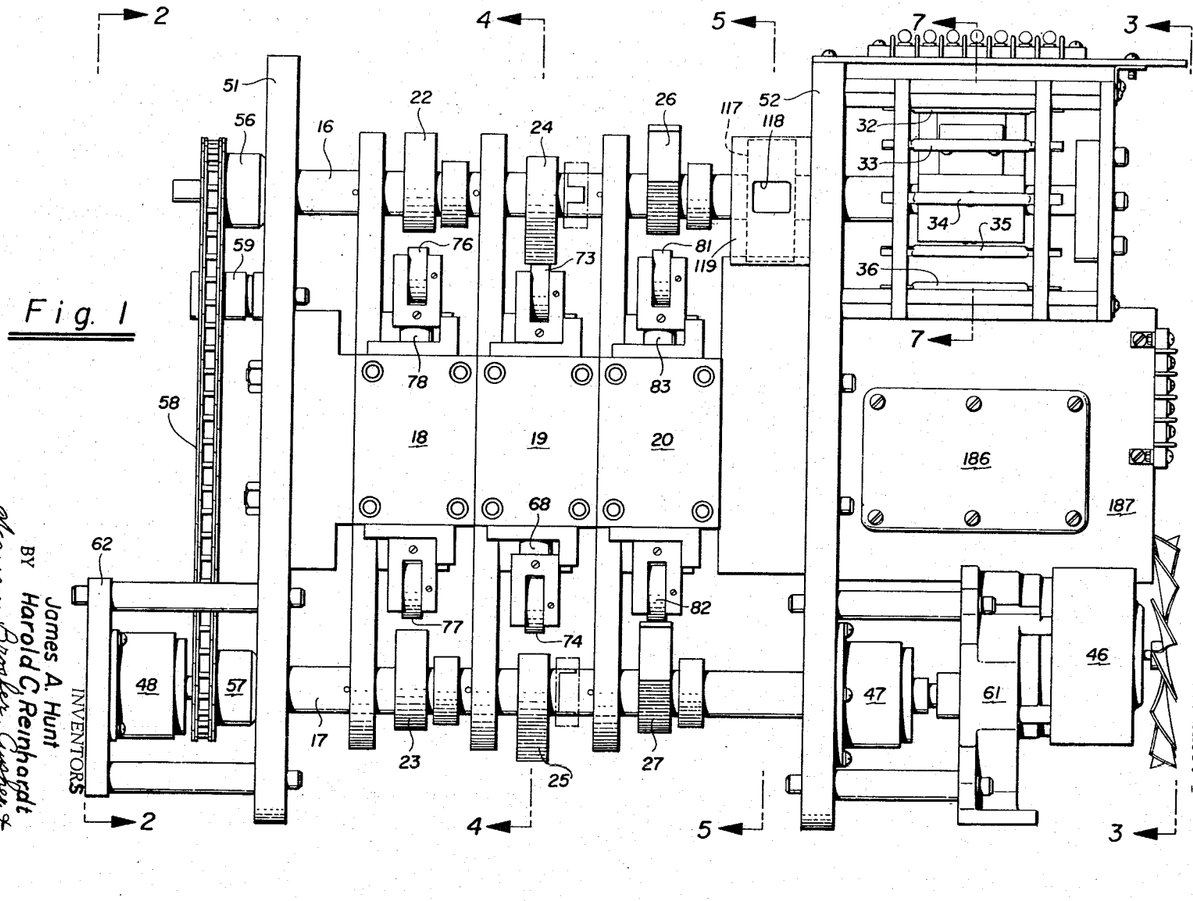
FIGURE 1 is a side elevation of a control device constructed in accordance with the present invention.
Figure 2:
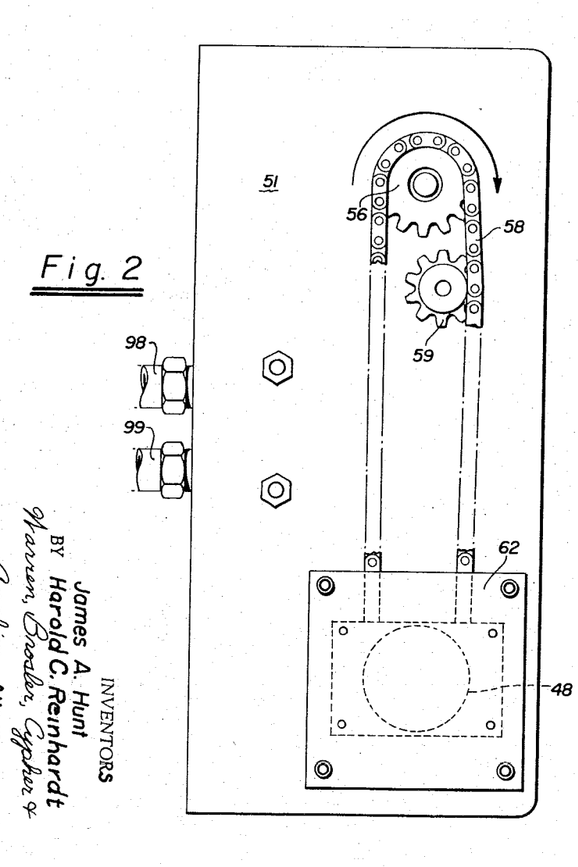
FIGURE 2 is an end elevation of the device taken from the position indicated by line 2—2 in FIGURE 1.
Figure 6:
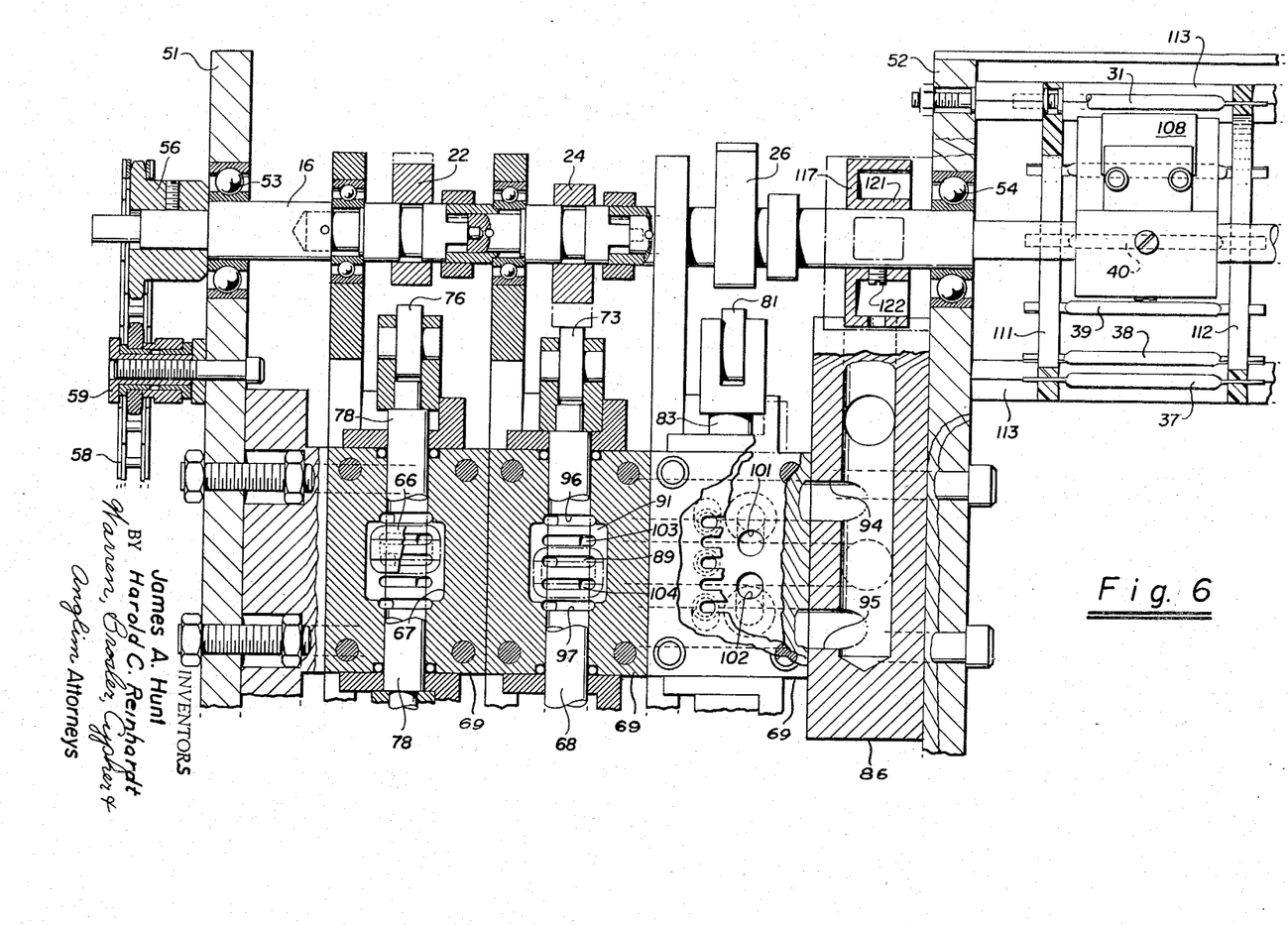
FIGURE 6 is a fragmentary cross-sectional view of the device as taken substantially on the plane of line 6—6 in FIGURE 3.

With reference to FIGURE 1, it will be seen that the control device is assembled on a mounting frame having spaced opposed end plates 51 and 52. Cam shafts 16 and 17 are journalled for rotation between these end plates and are preferably made up in sections as seen in FIGURES 1 and 6 for enabling easy assembly of any desired number of cams and controllers for controlling the piece of equipment to be automated. As here shown, three cam shaft units are fitted together end to end to provide each of the cam shafts which are journalled at their opposite ends in bearings 53 and 54 carried by the end plates 51 and 52. The shafts 16 and 17 project through plate 51 and are fitted with chain sprockets 56 and 57 around which a link drive chain 58 is entrained to provide for joint driving rotation of the shafts 16 and 17. An idler sprocket 59 may be mounted and meshed with the chain at the interior of the chain loop as illustrated in FIGURE 2 to furnish a means of properly tensioning the drive chain. Each of the shaft sections is here fitted with one of the cams 22–26. It will be observed that drive sprockets 56 and 57 are of identical size so that the two shafts will rotate at precisely the same speed in synchronism. Accordingly shaft 16 and cams 22, 24 and 26 will make one revolution while shaft 17 and cams 23, 25 and 27 make precisely the same revolution. Thus, during a single revolution of the shafts and at pre-selected portions of the cycle, the several cams 22–27 will effect in desired sequence the forward and return displacement of controllers 18, 19 and 20.

With reference to FIGURE 1, it will be noted that motor 46 is connected to clutch 47 through a reduction gear head 61 so as to effect an appropriate speed reduction of rotation of shaft 17 when clutch 47 is energized to close the driving connection between gear head 61 and shaft 17. Preferably, motor 46 runs continuously during the operation of the unit; and shafts 16 and 17 are stepped ahead through their several stations by simultaneously energizing electric clutch 47 and de-energizing electric brake 48 and then reversing the energization to de-energize clutch 47 and to energize brake 48. As will be observed from FIGURE 1, electric brake 48 is mounted on shaft 17 exterior of sprocket 57 and is secured by a frame support 62 to end plate 51.

Figure 4:
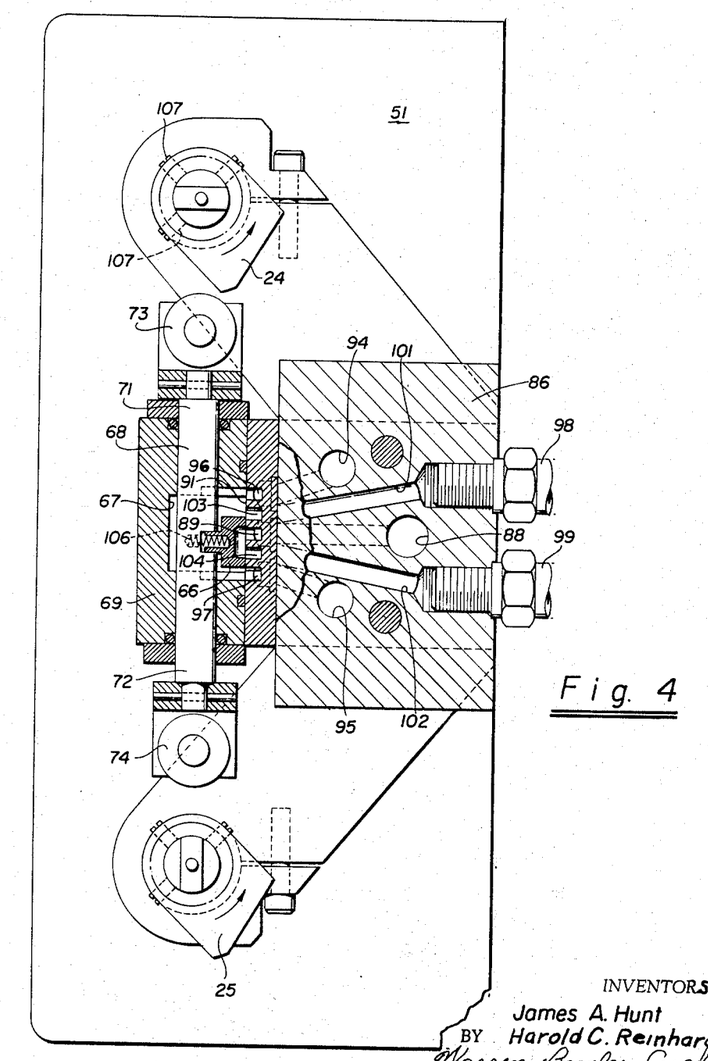
FIGURE 4 is a cross-sectional view of the device as taken substantially on the plane of line 4—4 of FIGURE 1.

The two-way controllers 18, 19 and 20 are here banked together as seen in FIGURES 1 and 6 between the two cam shafts 16 and 17 and each is provided with an internally arranged slide valve member 66, see FIGURE 4, mounted on a valve stem 68 for reciprocation within a valve chamber 67, valve stem 68 being in turn slidably mounted for reciprocation in the valve housing 69. The opposite ends 71 and 72 of valve stem 68 are fitted with cam follower rollers 73 and 74 which are positioned for engagement with and displacement by cams 24 and 25. The foregoing detailed description of the valve has been given in reference to the center valve 19 as shown in FIGURE 4 and applies equally well to the other valves 18 and 20. In the case of valve 18 cam follower rollers 76 and 77 are mounted on the opposite ends of valve stem 78 for engagement with and displacement by cams 22 and 23. Similarly, cam follower rollers 81 and 82 are mounted on the ends of valve stem 83 of valve 20 for engagement with and reciprocal displacement by cams 26 and 27. It will be observed that the construction and mounting of valve members 18, 19 and 20 is such that the internal valves 66 of these members and their connected valve stems 68, 78 and 83 reciprocate in directions towards and away from the cam shafts 16 and 17 for proper valve reciprocation by the pairs of cams 22 and 23, 24 and 25, and 26 and 27 mounted on the cam shafts.

Figure 5:
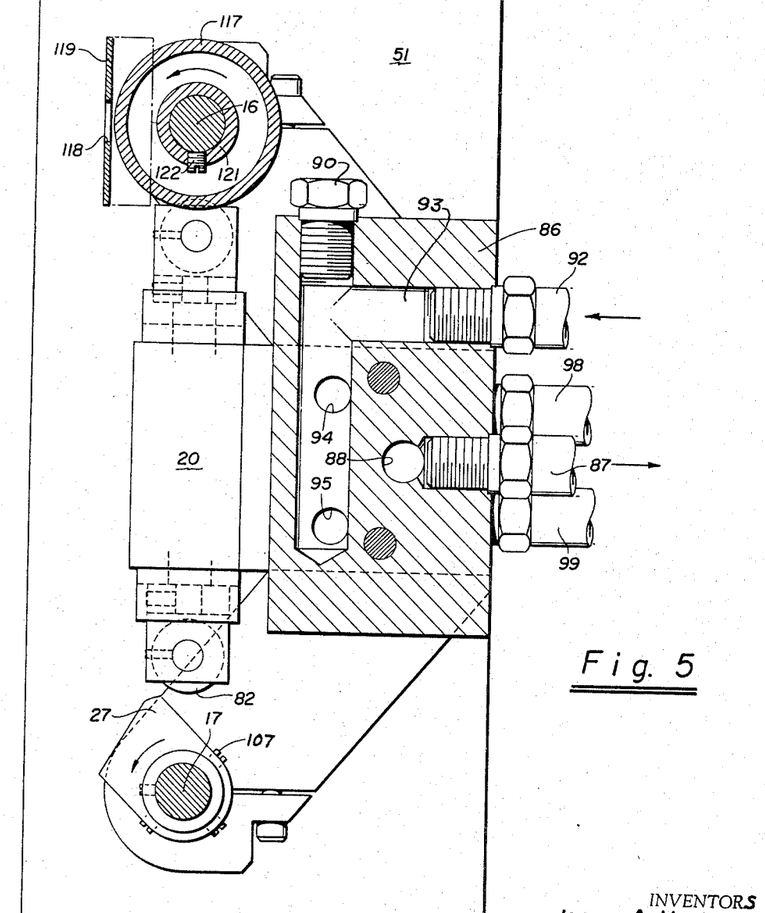
FIGURE 5 is a cross-sectional view of the device taken substantially on the plane of line 5—5 of FIGURE 1.
Figure 9:
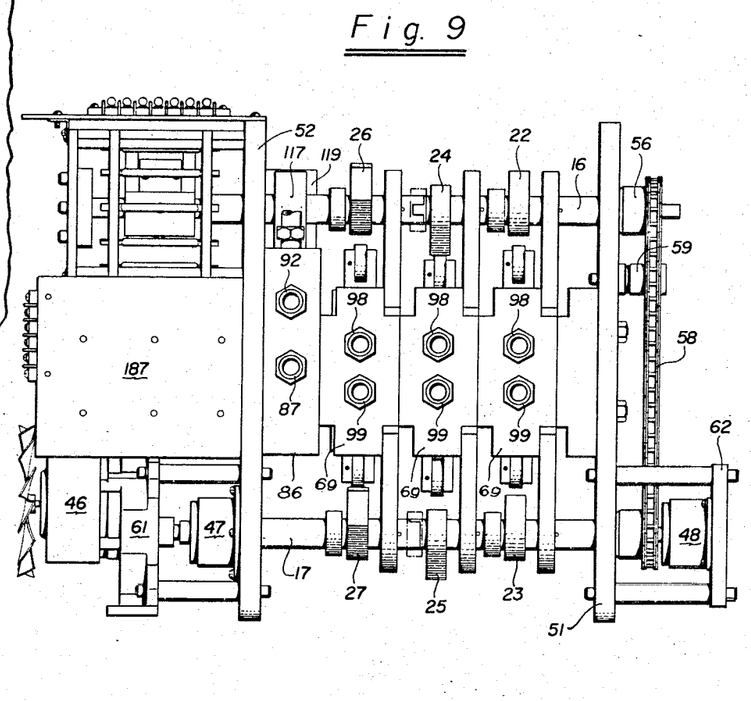
FIGURE 9 is a rear elevation of a portion of the control device.

Reciprocation of the two-way slide valves 18, 19 and 20 effects a reversal in flow of the hydraulic fluid to the actuators on the machine being automated so as to effect a correlated advance and retraction of the machine parts operated by such actuators. With reference to FIGURES 4 and 5, it will be seen that the valve housings 69 are bolted to a manifold block 86 and returning fluid is withdrawn from the manifold block to a suitable hydraulic reservoir by conduit 87 which connects to an internal passage 88 which in turn leads to a horizontally elongated slotted port 89 in an internal wall surface 91 in valve chamber 67 of each of the valves 18, 19 and 20. Fluid under pressure is brought into the manifold block 86 through conduit 92 which connects to fluid passage 93. Fluid passage 93 is closed to the outside by a plug 90 and branches into a pair of passages 94 and 95 which lead to a pair of upper and lower horizontally elongated slotted ports 96 and 97 in wall 91 on opposite sides of the centrally positioned return port 89. Connection to the hydraulic actuator on the machine being automated is effected by conduits 98 and 99 which are connected to each of the valve housings 69 (FIGURE 9) and to internal passages 101 and 102 therein (FIGURE 6) and which in turn lead to horizontally elongated slotted ports 103 and 104 in wall 91. As will be observed from FIGURES 4 and 6, port 103 is located between ports 96 and 89 and port 104 is positioned between ports 89 and 97. Valve member 66 is seen in FIGURE 4 to have a cup-like structure with the lips of the cup pressed against wall 91 by spring 106 and the hydraulic pressure of the system, the cup lips being dimensioned to surround and seal in communication return port 89 and either actuator port 103 or 104 depending upon the reciprocally displaced position of the valve cup. As seen in FIGURE 4, where the valve member has been displaced downwardly by the top cam 24, hydraulic fluid under pressure will pass from port 96 to port 103 and then out to the hydraulic actuator by conduit 98. Fluid will return from the actuator by conduit 99 and enter the valve chamber through port 104 and return to the source by ports 89, 88 and conduit 87. Upon displacement of the valve member upwardly by the bottom cam 24, the valve cup will surround and seal in communication port 89 and the next upper port 103. In this position of the valve hydraulic fluid under pressure will be transmitted to the actuator at the machine being automated through conduit 99. Fluid will return from such actuator through conduit 98, into the valve chamber by passages 101 and port 103, and from the valve chamber by ports 89, 88 and conduit 87 to the source.

In accordance with the present invention, the individual cams 22–27 are provided with angular settings predetermined to provide on one complete revolution of shafts 16 and 17, an operation of the machine being automated through one complete operating cycle. Accordingly, there is provided a two-way valve and a pair of cams for reciprocating the valve for each of the hydraulic actuators for the parts of the machine being automated. The cams are set to actuate the machine parts in proper sequence. For example, cam 22 may be set to displace valve 18 downwardly as seen in FIGURE 1 at the beginning of the cycle and the valve will remain in this position until it is engaged and displaced upwardly by cam 23 at any desired subsequent part of the cycle. As will be seen in the drawings, each of the cams is provided with set screws 107 permitting ready setting of the desired angular position of each of the cams to provide for desired sequential operation of the cams. For convenience, the cams, valves and switches are arranged for operation at 30° intervals so that a total of 12 operating steps or stations is provided for controlling 12 operating functions of the machine being automated during one revolution of the cam shafts.

A rotary switch connected to shaft 16 exterior of plate 52 and including switches 31–42 hereinabove referred to, functions to stop the shafts as they reach the successive 30° stations; the twelve switches 31–42 corresponding with the twelve operating stations of the unit. In the present construction and as will be best seen in FIGURES 1, 6 and 7 of the drawings, magnetic switches are used. These are sometimes referred to as magnetically operated reed switches. Each switch is composed of a pair of current conducting reeds which are mounted in end to end overlapping relation in a sealed glass tube, preferably in the presence of an inert gas. In the present construction the reeds are normally separated so as to provide an open switch condition. This may be conveniently accomplished by biasing or premagnetizing the reeds. The twelve switches 31–42 are mounted concentrically to shaft 16, see FIGURE 7, and in equally spaced circumferential relation so as to define the twelve 30° spaced operating stations. A magnet 108 is mounted on shaft 16 for rotation therewith into juxtaposition to the magnetically operated switches 31–42 for actuation thereof at the several stations, the magnet functioning in each instance to close the reeds of the switch to make electrical contact therebetween as the magnet comes into juxtaposition to the switch. This type rotary switch provides a very high degree of reliability and a virtually unlimited life for present purposes. With reference to FIGURES 1, 6 and 7 it will be seen that the tube switches 31–42 are mounted in parallel circumferentially spaced relation in a frame-cage-like structure including a pair of end plates 111 and 112 arranged for supporting the opposite ends of the tubes and which are in turn supported by posts 113 to the end wall 52 of the main frame. Magnet 108 is here adjustably mounted in a clamp 114 secured to cam shaft 16 by set screws 115.

As a feature of the present invention there is provided on the control unit a visual indicator showing the operating station, then holding, and correspondingly the operating function taking place at the machine being automated. Accordingly, if there is a failure of any part of the control machine to operate properly, the control apparatus will hold in the station it is in until the machine part is repaired or the malfunctioning corrected. As will be best seen in FIGURES 1, 5 and 6 there is provided on cam shaft 16, interior of plate 52, a dial indicator 117 which is carried by shaft 16 for rotation in front of a window 118 provided in a front plate 119. Dial indicator 117 is here formed as a wheel having a central hub 121 secured as by set screw 122 to shaft 16, and having a cylindrical periphery suitably imprinted or inscribed with the numbers 1 to 12 spaced equally circumferentially there around corresponding with the twelve stations, the number appearing through window 118 indicating the station in which the apparatus is.

The operation of the control device and system of the present invention will be best understood with reference to a specific application such as a plastic injection molding machine which has been selected in the following for purposes of illustration, it being understood that the control device may be applied to many other types of machines.

Figure 8:
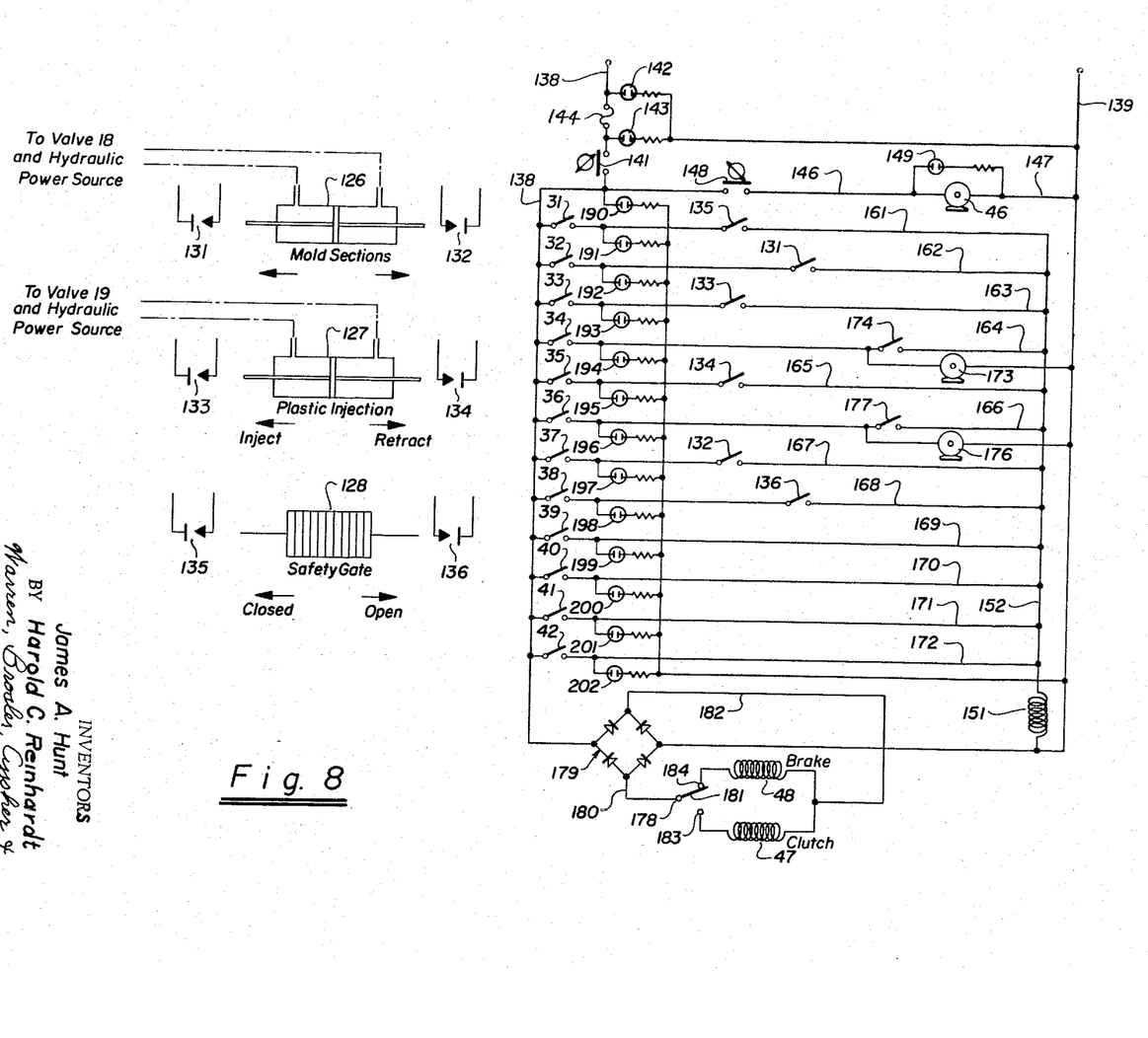
FIGURE 8 is a schematic electrical wiring diagram of the control device as applied to a machine to be automated.

For present purposes, a plastic injection molding machine includes a pair of mold sections which are movable to a closed position to cooperatively form a cavity for molding a part to be made; a two-way hydraulic actuator 126, see FIGURE 8, for opening and closing the mold sections; a heated cylinder into which plastic granules are fed for plasticizing prior to injection into the closed mold, and a ram or piston which is mounted for reciprocation in the cylinder for driving the heated plastic into the closed mold; a two-way hydraulic actuator 127 for reciprocating the piston; a manually reciprocating safety gate 128 which is provided on the machine to prevent accidentially reaching into the machine between the open mold sections at a time when these sections are moving to closed position; limit switches 131 and 132 for sensing the movement of actuator 126 to close and open the mold sections respectively, the switches being normally open and being closed by the actuator upon movement to its two positions noted; normally open limit switches 133 and 134 associated with the plastic injection actuator 127 and being closed at the ends of the injection and retraction strokes respectively of the ram; and normally open limit switches 135 and 136 associated with the safety gate 128 and being moved thereby to closed position when the safety gate is moved to closed and open positions respectively.

The interaction of the control device of the present invention to the plastic injection molding machine will be best seen with reference to the electric schematic wiring diagram shown in FIGURE 8. Electrical power is supplied through leads 138 and 139 and is controlled by a master power switch 141. Indicator lights 142 and 143 connected around a fuse 144 show that electricity is being supplied to the unit when both lights are on and that fuse 144 is open when lamp 142 only is on. Electric motor 46 is connected by conductors 146 and 147 to the supply lines 138 and 139 with a manually controlled switch 148 mounted in conductor 146 to turn the motor on and off. Normally the motor 46 will operate continuously during the operation of the unit. An indicator lamp 149 is connected across motor 46 to show that power is being supplied to the motor.

Energizing of the clutch and brake 47 and 48 is effected by a plurality of branch parallel circuits all connected to a relay coil 151. As will be seen in FIGURE 8 one end of relay coil 151 is connected to input lead 139. The opposite end of the coil is connected to the conductor 152 which provides a terminal for twelve branch circuits, corresponding with the twelve operating stations of the unit, and here represented by conductors 161, 162, 163, 164, 165, 166, 167, 168, 169, 170, 171 and 172. Each of the conductors 161–172 terminate at one end at conductor 152 leading to relay 151, and are connected at their opposite ends through the magnetic rotary switches 31–42 to supply lead 138, as illustrated in FIGURE 8. Safety gate switch 135 is connected in series with magnet switch 31 in conductor 161. Mold section actuator switch 131 is connected in series with magnet switch 32 in conductor 162. Plastic injection switch 133 is connected in series with magnet switch 33 in conductor 163. A timer motor 173 and a normally open switch 174 actuated thereby is connected in series with magnet switch 34 in conductor 164. Plastic injection retract switch 134 is connected in series with magnet switch 35 and conductor 165. A timer motor 176 and normally open switch 177 actuated thereby are connected in series with magnet switch 36 in conductor 166. Mold section actuator switch 132 is connected in series with magnet switch 37 in conductor 167. Safety gate switch 136 is connected in series with magnet switch 38 in conductor 168. Branch circuits as represented by conductors 169, 170, 171 and 172 are not required for the operation of the plastic injection molding machine.

Figure 3:
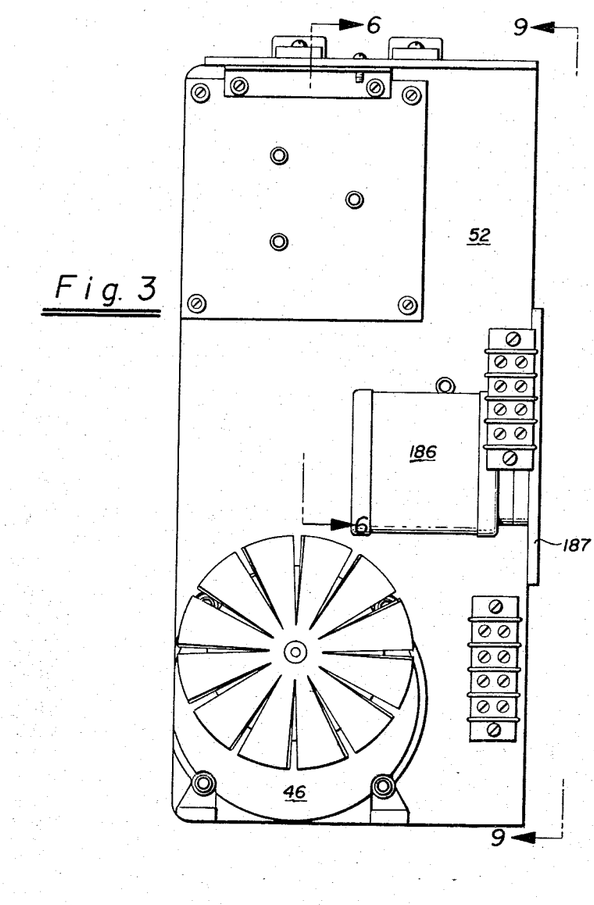
FIGURE 3 is an end elevation of the device taken from the opposite end as indicated by line 3—3 in FIGURE 1.

As will be seen from the foregoing, the closing of any of the branch circuits 161–172 will energize relay coil 151. A single pole double-throw relay switch 178 is operated by relay coil 151. Switch 178 has a normally biased position, as illustrated in FIGURE 8, conducting current from a D.C. rectifier 179 through electric brake 48 thus normally setting the brake and holding the cam shafts 16 and 17 in one of their twelve operating stations. As here shown, rectifier 179 is of a full wave bridge type connected to supply leads 138 and 139 and having one output lead 180 connected to the moving arm 181 of switch 178, and a second output lead 182 connected to one end of the clutch and brake windings 47 and 48. The opposite ends of the clutch and brake windings are connected to switch contacts 183 and 184 respectively, it being noted that the switch arm is normally biased to engage a contact 184 thereby energizing brake 48. Upon energizing relay winding 151, however, switch arm 181 will be caused to swing into engagement with contact 183, thereby opening the circuit to the brake 48 and closing the circuit to clutch 47 and making the drive connection between motor 46 and cam shaft 17. The relay and rectifier are here housed in a box-like enclosure 186 mounted on a terminal board 187 secured to frame end plate 52, see FIGURES 1 and 3.

In the presently described application of the control device, valve 18 is connected to hydraulic actuator 126 using conduit connections 98 and 99 and is connected to a hydraulic power source using conduits 87 and 92. Thus, on reciprocation of valve 18 by cams 22 and 23, actuator 126 will be reciprocated to close and open the mold sections and to close limit switches 131 and 132 accordingly. In the same manner the two-way cam operated valve 19 is connected to hydraulic actuator 127 so that upon reciprocation of valve 19 by cams 24 and 25, hydraulic actuator 127 will be reciprocated to effect injection of the fluid plastic material and retraction of the injecting ram and the operation of limit switches 133 and 134 accordingly. Since in the application of the control device to the plastic injection molding machine being described, only two hydraulic actuators are used on the machine being automated, only two of the valves 18 and 19 are required to be used, consequently valve 20 would not be required for this application.

Referring now to the electrical schematic diagram, FIGURE 8, a description of operation of the control system as applied to the plastic injection molding machine follows. Assume the control device is positioned in station No. 1, that is, in the upright position of magnet 108, see FIGURE 7, thereby closing magnetic reed switch 31. Assuming also that electric power is applied over leads 138 and 139 and that fuse 144 is not burned out, indicator bulbs 142 and 143 will be illuminated showing that power is available and the system ready. The operator then closes the master switch 141 energizing the system and closes switch 148 turning on electric motor 46. Indicator light 149 will show the motor on.

As above explained, all of the magnetic reed switches 31–42 and limit switches 131–136 are normally open so that at the start of operations with the safety gate 128 open, mold sections open, and plastic injection ram in retracted position, only switches 31, 132, 134 and 136 will be closed. Since these switches are in different branch circuits, all of the branch circuits will be open.

The operator will next close the safety gate, and this act will automatically initiate operations since it will close switch 135 which is in series with magnetic reed switch 31 in branch circuit 161. Power is therefore delivered through conductor 152 to relay 151 causing relay switch arm 181 to swing into engagement with contact 183 thereby energizing clutch 47 and de-energizing brake 48. Motor 46 operating through closed clutch 47 will start rotation of cam shafts 16 and 17. As magnet 108 swings, counterclockwise as viewed in FIGURE 7, switch 31 will open and switch 32 will close when the magnet has moved approximately 30° to station No. 2. For convenience, the stations 1–12 are noted on FIGURE 7. The reed switches 31–42 are adjusted to magnet 108 so as to close when the magnet approaches the station in which the switch is placed and to open as the magnet proceeds to the next station. Some overlap is provided, that is, the switch ahead will close before the switch behind opens, and the opening of each switch is set to occur quite precisely with the arrival of magnet 108 at the next station. Consequently, as cam shafts move to station 2, switch 31 will open thereby opening clutch 47 and setting brake 48 thereby holding the device in station 2, it being noted that while switch 32 is closed, switch 131 in series therewith in branch circuit 162 is open so that in station 2 at this moment the circuit to relay 151 is open.

Cam 22 is so positioned on cam shaft 16 that during the movement of the cam shafts from station 1 to station 2, cam 22 will engage roller 76 on valve 18 and displace the valve downwardly as seen in FIGURE 1, thus causing a displacement of actuator 126 to the left as seen in FIGURE 8 to close and clamp the mold sections. The unit will remain at rest in station 2 until the mold sections are closed. Should there be a malfunctioning of the plastic injection molding machine at this point, and mold sections fail to close, the system will wait indefinitely in station 2. On the happening of such an event the operator by looking at the indicator wheel 117 will be directed to the mold closing actuator for the trouble. Upon closing of the mold sections, switch 131 will close thereby completing branch circuits 162 to energize relay 151 and cause the energizing of clutch 47 and de-energizing of brake 48 and rotation of the cam shafts to station 3. In station 3 switch 32 opens to open the clutch drive 47 and set brake 48 thus holding the shafts in station 3.

In station 3 reed switch 33 is closed but switch 133 is open. Accordingly, the unit will rest in station 3 until switch 133 is closed. Cam 24 on cam shaft 16 is set so as to engage roller 73 of valve 19 and displace this valve downwardly, as seen in FIGURE 1, upon movement of cam shaft 16 from station 2 to station 3. This displacement of valve 19 feeds hydraulic power to actuator 127 for the plastic injection ram causing it to move in its injection stroke, to force fluid plastic into the closed mold sections. At the end of the plastic injection stroke switch 133 will close thereby signalling the successful completion of this function of the machine and cause the cam shafts to rotate to station No. 4 at which point switch 33 opens thereby stopping the cam shaft in station No. 4. It will be noted that during this operation valve 18 remains in its downwardly displaced position and will so remain until it is picked up and displaced by cam 23 at a preselected later part of the operating cycle. One of the features of the present apparatus is that once one of the valves 18–20 are displaced, they will simply set in their displaced position while other functions are going on and will be returned to their first positions at the desired part of the operating cycle.

In station 4, the closing of switch 34 energizes timer motor 173 as seen in FIGURE 8 so as to start the operation of a timer which controls the injection time. At the end of this time, which is predetermined by the operator, normally open timer switch 174 closes thus completing branch circuit 164 and again energizing clutch 47 and de-energizing brake 48 and causing the cam shafts to rotate to station 5. As the cam shafts reach station 5, switch 34 opens thereby holding the unit in station 5. Timer switch 174 will also reopen so as to be ready for the next cycle of operation.

Cam 25 is so positioned on cam shaft 17 that it will engage roller 74 on valve 19 to displace this valve upwardly, as seen in FIGURE 1, upon movement of the cam shafts from station 4 to station 5. Accordingly, hydraulic power is applied to actuator 127 so as to cause the injection ram to retract. When the ram has reached its fully retracted position, switch 134 will close. As will be observed from FIGURE 8, switch 134 is in series with switch 35, closed by magnet 108 in station 5, thus completing branch circuit 165 and energizing clutch 47 and de-energizing brake 48 and causing the cam shafts to rotate to station 6. As the cam shafts approach station 6, switch 35 opens to hold the cam shafts in station 6.

In station 6, magnetic switch 36 is closed but timer switch 177 in series therewith in branch circuit 166 is open so that the parts will remain in station 6 until switch 177 is closed. Closing of switch 36, however, energizes timer motor 176 which commences the start of a timing operation to complete the molding of the parts in the mold sections. At the end of this pre-selected time period, switch 177 will be closed thereby causing the apparatus to advance to station 7 where switch 36 opens to hold the cam shafts. Timer switch 177 will automatically reset to open position so as to be ready for the next operating cycle.

In station 7 switch 37 will be closed but switch 132 in series therewith is open thereby causing the apparatus to hold in station 7 until switch 132 is closed. Cam 23 is so positioned on cam shaft 17 that it will engage roller 77 during the movement of the parts from station 6 to station 7 thereby displacing valve 18 upwardly as seen in FIGURE 1 to reverse the hydraulic power connections to actuator 126 causing it to move to the right, as seen in FIGURE 8, to open the mold sections. When the mold sections are opened switch 132 will be closed thereby completing branch circuit 167 and causing the cam shafts to rotate to station 8, where switch 37 opens to hold the parts in station 8.

In station 8 switch 38 is closed, but safety gate switch 136 is open so that the parts will remain at rest in station 8 until the safety gate 128 is open to remove the molded part from the open mold sections. Opening of safety gate 128 will close switch 136 thereby closing branch circuit 168 and causing the cam shafts to advance to station 9 where switch 38 opens.

Since the operation of the plastic injection molding machine is completed through one operating cycle in the first eight stations of the control unit, the control unit is caused to advance continuously through stations 9, 10, 11 and 12. As will be seen from FIGURE 8, switches 39, 40, 41 and 42 are connected directly by branch conductors 169, 170, 171 and 172 to the relay conductor 152 so as to hold the relay energized as switches 39–42 are successively energized upon movement of cam shafts to stations 9 to 12 inclusive. As the cam shafts reach station 9, switch 39 will close to energize branch circuit 169; as the parts advance to station 10, switch 40 will close before switch 39 opens thereby continuing the energization of the relay 161 and the continued rotation of the cam shafts. In this manner the cam shafts will proceed without interruption from station 9 to station 1. When the cam shafts arrive in station 1, switch 31 is closed but safety gate switch 135 in series therewith is open thus causing the parts to hold up on station 1 until the next operating cycle of the machine is started by closing of the safety gate as above described.

Preferably, and as here shown, a plurality of indicator light bulbs 190, 191, 192, 193, 194, 195, 196, 197, 198, 199, 200, 201 and 202 are connected as illustrated in FIGURE 8 so as to indicate power on after throwing of master switch 141 and the presence of the control apparatus in each of the twelve operating stations. Thus indicator light 191 will be on when the control unit is in station 1; control light 192 will be on when the control unit is in station 2; and so on. These indicator lights may be mounted on a panel convenient for viewing by the operator and will constantly inform the operator as to the station in which the control unit is and correspondingly the function taking place in the machine being automated. All of the indicator lights hereinabove noted are preferably of the small neon or gaseous discharge type and are connected through appropriate resistors shown on the wiring diagram, FIGURE 8.

It is possible in certain machines that certain actuators will be operated more than once during a full operating cycle. To accomplish this result, the cams displacing the valve controlling such an actuator may be provided with a plurality of lobes, one for each operation of the actuator, and these lobes may be arranged to cause the operation of the actuator at each of the desired points of the operating cycle. One of the basic concepts of the apparatus of the present invention, is that the power for operating the individual moveable parts of the equipment being automated is monitored and controlled directly by the two-way valves 18, 19 and 20 without the use of relays or solenoid valves or other apparatus or circuitry. This results in important saving of parts and improved service and reliability. Where the operation of the individual parts of the machine being automated is operated electrically, instead of hydraulically, heavy duty electric switches may be used in the place of valves 18–20, the essential thing being that the power for operating these individual parts is directly controlled, stopped and reversed, by the controllers 18–20 whether hydraulically or electrically.

Another important feature of the present apparatus is that it operates individually on each operation to be performed and nothing else can be performed until after that operation is completed. As above noted, the control unit cannot advance to the next station to perform the next function until all operations called for in each station have been completed. Thus, if there is a breakdown of the machine being automated there will only be one reject part at the most. The machine will simply not advance to the next operation. Also by the use of the indicator dial 117 and indicator lights 191–202, the operator will be directed to the portion of the automated machine where the failure has occurred.

We claim:

1. A control device for apparatus having a reciprocally moving part and reciprocally moving actuator therefor comprising, first sensors sensing the terminal positions of said part, a pair of spaced apart parallel cam shafts connected for joint rotation to circumferentially spaced operating stations, a two-way controller adapted for connection to an energy source and to said actuator and having reciprocally displaced positions effecting a correlated displacement of said actuator and part, cams mounted on said shafts and engageable with said controller for reciprocal displacement thereof upon rotation of said shafts to said stations, second sensors mounted for sensing the positioning of said shafts in said stations, power driven means connected to said shafts, and a power circuit adapted for connection to a power source and being connected to said power driven means and said first and second sensors for advancing said shafts in steps from station to station as said part is successively displaced to terminal positions.

2. A control device as characterized in claim 1, wherein said power driven means comprises: a motor, a clutch connecting said motor and shafts, and a brake mounted for stopping said shafts, said clutch and brake being connected for operation by said first and second sensors for effecting said station to station advancing of said shafts.

3. A control device for apparatus having a reciprocally moving part and reciprocally moving actuator therefor comprising, first electric switches sensing the terminal positions of said part, a pair of spaced apart parallel cam shafts connected for joint rotation to circumferentially spaced operating stations, a two-way controller adapted for connection to an energy source and to said actuator and having reciprocally displaced positions effecting a correlated displacement of said actuator and part, cams mounted on said shafts and engageable with said controller for reciprocal displacement thereof upon rotation of said shafts to said stations, second electric switches mounted for sensing the positioning of said shafts in said stations, an electric motor for driving said shafts, an electric clutch connecting said motor to said shafts, an electric brake mounted for stopping said shafts, and an electric circuit adapted for connection to a power source and being connected to said motor and said clutch and brake and said first and second switches for advancing said shafts in steps from station to station as said part is successively displaced to terminal positions.

4. A control device for apparatus having a plurality of parts adapted for reciprocal displacement in predetermined sequence and reciprocally moving actuators therefor comprising, a plurality of first electric switches sensing the terminal positions of said parts, a pair of spaced apart parallel cam shafts connected for joint rotation to a plurality of circumferentially spaced operating stations, a plurality of two-way controllers each adapted for connection to one of said actuators and each having reciprocally displaced positions effecting a correlated displacement of the connected actuator and part, a plurality of cams mounted on said shafts and engageable with said controllers for reciprocal displacement thereof upon rotation of said shafts to said stations, a plurality of second electric switches mounted for sensing the positioning of said shafts in said stations, electric motor, an electric clutch connecting said motor to said shafts, an electric brake mounted to stop said shafts, and an electric circuit adapted for connection to a power source and being connected to said motor and said clutch and brake and said first and second switches for advancing said shafts in steps from station to station as the successive displacement of said parts is completed.

5. A control device for apparatus having a plurality of reciprocally moving parts and reciprocally moving hydraulic actuators therefor moving in predetermined sequence comprising, a plurality of limit switches actuated at the terminal positions of said parts, a pair of spaced apart parallel cam shafts connected for joint rotation, an electric motor for driving said shafts, a plurality of two-way hydraulic slide valves each adapted for connection to one of said actuators and having reciprocally displaced positions effecting a correlated displacement of the connected actuator and part, a plurality of cams mounted on said shafts and engageable with said valves for reciprocal displacement thereof to said positions upon rotation of said shafts to predetermined circumferentially spaced stations, a plurality of second electric switches mounted for actuation by said shafts in said stations, an electric clutch connecting said motor and shafts, an electric brake for said shafts, and an electric circuit adapted for connection to an electric power source and being connected to said motor and clutch and brake and said limit and second switches for advancing said shafts in steps from station to station as the successive displacement of said parts is completed.

6. A control device for a machine having a plurality of reciprocally moving parts and reciprocally moving hydraulic actuators therefor moving in predetermined sequence to complete an operating cycle of the machine comprising, a plurality of limit switches actuated at the terminal positions of said parts, a pair of spaced apart parallel cam shafts connected for joint rotation, an electric motor for driving said shafts, a plurality of two-way hydraulic slide valves each adapted for connection to one of said actuators and having reciprocally displaced positions effecting a correlated displacement of the connected actuator and part, a plurality of pairs of cams mounted on said shafts, each pair including a cam on each shaft engageable with one of said valves for reciprocal displacement thereof to its said positions upon rotation of said shafts to predetermined circumferentially spaced stations, said cams having angular settings predetermined to provide on one complete revolution of said shafts an operation of said machine through one complete cycle, a plurality of second electric switches mounted for actuation by said shafts in said stations, an electric clutch connecting said motor and shafts, and an electric brake for said shafts and an electric current adapted for connection to an electric power source and being connected to said motor and clutch and brake said limit and second switches for advancing said shafts in steps from station to station as the successive displacement of said parts is completed.

7. A control device for apparatus having a reciprocally moving part and reciprocally moving actuator therefor comprising limit switches actuated at terminal positions of said part, a pair of spaced apart parallel cam shafts connected for joint rotation to circumferentially spaced operating stations, a two-way controlled adapted for connection to an energy source and to said actuator and having reciprocally displaced positions effecting a correlated displacement of said actuator and part, cams mounted on said shafts and engageable with said controller for reciprocal displacement thereof to its said positions upon rotation of said shafts to said stations, a plurality of magnetically operated switches mounted concentrically to one of said shafts and in angular positions defining said stations, a magnet mounted on said last-mentioned shaft for rotation therewith in juxtaposition to said magnetically operated switches for actuation thereof at said stations, electrically controlled power driven means connected to said shafts, and an electric current adapted for connection to an electric power source and being connected to said power driven means and said limit and magnetic switches for advancing said shafts in steps from station to station as said part is successively displaced to terminal positions.

8. A control device for a machine having a plurality of parts operating in predetermined sequence to complete an operating cycle of the machine comprising a plurality of first switches each sensing the completion of operation of each part, a pair of spaced apart parallel cam shafts connected for joint rotation to a plurality of circumferentially spaced stations, controllers adapted for connection to for controlling the operation of said parts, cams mounted on said shafts and engageable with for operating said controllers in said stations; electric power driven means for said shafts, second electric switches mounted for actuation by said shafts in said stations, and an electric circuit comprising a plurality of parallel branch circuits for energizing said electric power driven means, each of said branch circuits including one of said second switches and the next sequentially operated limit switch whereby said means will be successively energized and said shafts will be advanced in steps from station to station as said parts are successively operated in predetermined sequence through the complete operating cycle of the machine and the successive energization of said means is dependent in each instance upon the completion of operation of each of said parts.

9. A control device as characterized in claim 8 wherein said electric power driven means comprises, an electric motor, an electric clutch having an energized closed position and a deenergized open position connecting said motor to said shafts, and an electric brake having an energized position stopping said shafts and a deenergized position releasing said brake, said clutch and brake being connected to said circuit so that the closing of the switches in each branch circuit will release said brake and close said clutch and the opening of one of said last-mentioned switches will set said brake and open said clutch.

10. A control device for a machine having a plurality of reciprocally moving parts and reciprocally moving hydraulic actuators therefor moving in pre-determined sequence to complete an operating cycle of the machine comprising, a plurality of limit switches actuated at the terminal positions of said parts, a pair of spaced apart parallel cam shafts connected for joint rotation, an electric motor for driving said shafts, a plurality of two-way hydraulic slide valves each adapted for connection to one of said actuators and having reciprocally displaced positions effecting a correlated displacement of the connected actuator and part, a plurality of pairs of cams mounted on said shafts, each pair including a cam on each shaft engageable with one of said valves for reciprocal displacement thereof to its said positions upon rotation of said shafts to predetermined circumferentially spaced stations, said cams having angular settings predetermined to provide on one complete revolution of said shafts an operation of said machine through one complete cycle, a plurality of second electric switches mounted for actuation by said shafts in one of said stations, an electric clutch connecting said motor and shafts, an electric brake for said shafts, and an electric circuit for energizing said clutch and brake and including a plurality of parallel branch circuits each including one of said second switches and the next sequentially operated limit switch whereby said clutch and brake will be successively energized and said shafts will be advanced in steps from station to station as said parts are successively displaced in predetermined sequence through the complete operating cycle of the machine and the successive advancing of said shafts is dependent in each instance upon the completion of displacement of each of said parts.

11. A control device for apparatus having a plurality of parts adapted for reciprocal displacement in predetermined sequence and reciprocally moving actuators therefor comprising a plurality of first electric switches sensing the terminal positions of said parts, a pair of spaced apart parallel cam shafts connected for joint rotation to a plurality of circumferentially spaced operating stations, a plurality of two-way controllers each adapted for connection to one of said actuators and each having reciprocally displaced positions effecting a correlated displacement of the connected actuator and part, a plurality of cams mounted on said shafts and engageable with said controllers for reciprocal displacement thereof upon rotation of said shafts to said stations, a plurality of second electric switches mounted for sensing the positioning of said shafts in said stations, power driven means connected to said shafts, and an electric circuit adapted for connection to an electric power source and being connected to said power driven means and said first and second switches for advancing said shafts in steps from station to station as the successive displacement of said parts is completed, and indicator means connected to said shafts and showing the particular operating station the shafts are in as said shafts move from station to station.

12. A control device for a machine having a plurality of parts operating in predetermined sequence to complete an operating cycle of the machine comprising a plurality of first switches each sensing the completion of operation of each part, a pair of spaced apart parallel cam shafts connected for joint rotation to a plurality of circumferentially spaced stations, controllers adapted for connection to for controlling the operation of said parts, cams mounted on said shafts and engageable with for operating said controllers in said stations, electric power driven means for said shafts, second electric switches mounted for actuation by said shafts in said stations, an electric circuit comprising a plurality of parallel branch circuits for energizing said electric power driven means, each of said branch circuits including one of said second switches and the next sequentially operated limit switch whereby said means will be successively energized and said shafts will be advanced in steps from station to station as said parts are successively operated in predetermined sequence through the complete operating cycle of the machine and the successive energization of said means is dependent in each instance upon the completion of operation of each of said parts, and a plurality of electric indicator lamps connected to said branch circuits for showing the particular operating station the shafts are in as said shafts move from station to station.

References Cited
UNITED STATES PATENTS

| | | | |
|---|---|---|---|
| 1,357,384 | 11/1920 | Date | 192—144 |
| 1,993,413 | 3/1935 | Mellon | 192—144 |
| 2,595,486 | 5/1952 | Rosenberg | 91—413 |
| 2,818,150 | 12/1957 | Eck et al. | 192—144 |
| 2,853,900 | 9/1958 | Hillyer | 192—142 |
| 3,031,054 | 4/1962 | Thumim | 192—142 |

FOREIGN PATENTS

| | | |
|---|---|---|
| 451,090 | 10/1927 | Germany. |
| 479,717 | 7/1929 | Germany |

MARTIN P. SCHWADRON, *Primary Examiner.*

PAUL E. MASLOUSKY, *Examiner.*